Nov. 25, 1941.  E. EGER  2,264,021
PUNCTURE SEALING INNER TUBE
Filed Jan. 14, 1939
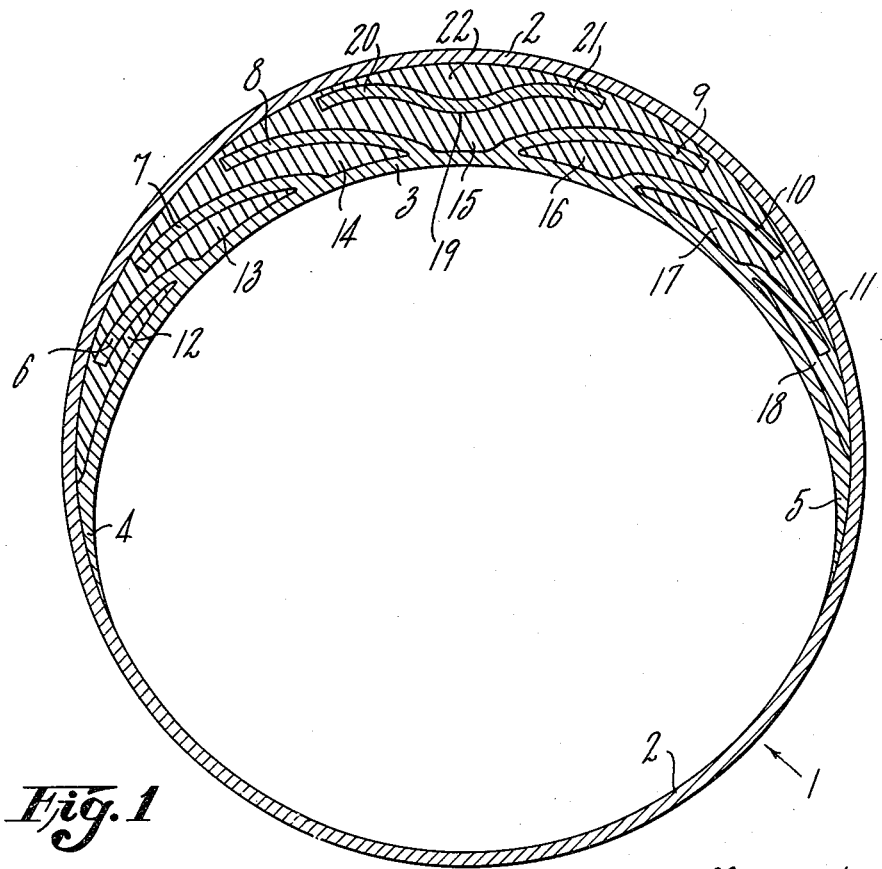
Fig. 1
Fig. 3
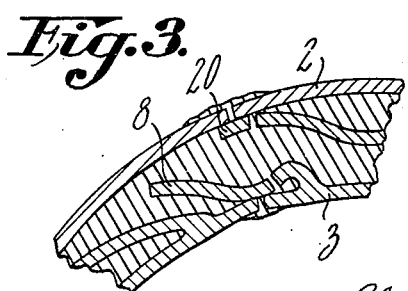
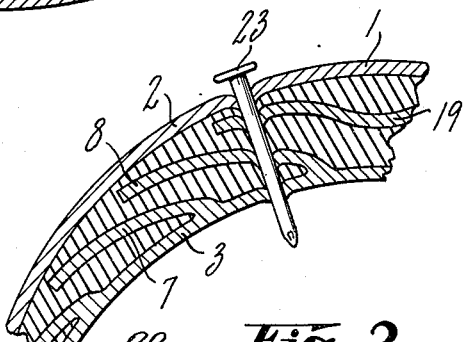
Fig. 2
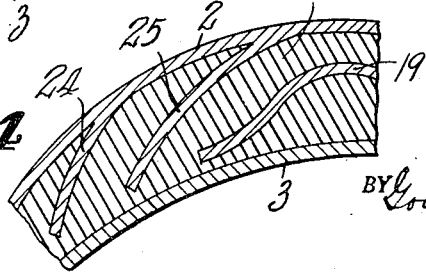
Fig. 4
INVENTOR.
ERNST EGER
BY Gourley & Budlong
ATTORNEYS.

Patented Nov. 25, 1941

2,264,021

UNITED STATES PATENT OFFICE 2,264,021

PUNCTURE SEALING INNER TUBE

Ernst Eger, Grosse Pointe Park, Mich., assignor to United States Rubber Company, New York, N. Y., a corporation of New Jersey Application January 14, 1939, Serial No. 250,951

6 Claims. (Cl. 152—347)

This invention relates to inner tubes for pneumatic tires. More particularly, the invention relates to improvements in inner tubes embodying plastic puncture sealing compounds.

The principal aim of the present invention is to provide a means of minimizing or entirely eliminating the disadvantage and danger of tire puncture. I provide an inner tube having a double wall at the crown thereof to retain a plastic compound. The continuity of the plastic compound is broken into sections by partitions extending internally of the double wall from one side thereof. If and when an ordinary puncture producing agent pierces the inner tube, the plastic compound flows through the apertures so produced and clogs the apertures, thus preventing deflation of the tire. Loss of plastic compound from the sections thereof disturbs the equilibrium of the partitions and causes dislocation of the partitions. This shifting of the partitions limits the flow of the plastic material and increases the effectiveness of the plastic material in sealing a puncture.

It is, therefore, among the objects of my invention to provide an inner tube which substantially eliminates loss of air as a result of a puncture; to provide means for limiting the flow of puncture sealing plastic material; to provide means located within the puncture sealing plastic material which, through displacement thereof, is adapted to assist in sealing a puncture; and, to provide a construction which may be manufactured efficiently and economically.

These and other objects and advantages will appear more fully in the following detailed description when considered in connection with the accompanying drawing, in which:

Fig. 1 is a view, in transverse section, of a pneumatic inner tube embodying my invention;

Fig. 2 is a fragmentary view, in cross section, of the tube illustrated in Fig. 1, and showing a nail passed through the inner tube;

Fig. 3 is a fragmentary view, similar to Fig. 2, illustrating the state of the inner tube after the nail has been extracted; and Fig. 4 is a fragmentary view of a modified form of the invention.

In Fig. 1 the reference character 1 denotes a complete inner tube embodying the present invention. As in conventional practice, the tube includes a principal wall 2. At the outer or crown portion of the tube a layer of rubber composition 3 forms with the wall 2 a double wall in this region. The extremities of the wall 3 are preferably vulcanized at 4 and 5 to the sides of the wall 2. A chamber is thus provided for retaining a puncture sealing composition. The inner wall 3 is provided with a plurality of circumferentially extending fins 6, 7, 8, 9, 10, and 11 which function as partitions for partially segregating sections of plastic composition 12, 13, 14, 15, 16, 17, and 18. The partitions 6 to 11, inclusive, extend obliquely toward the outer wall 2 and terminate in close proximity thereto. Most of the partitions overlap adjacent partitions for approximately and preferably half their length.

The plastic element contained between the walls 2 and 3 may be of any conventional composition adaptable to function as a puncture sealing medium. Usually the material is a rubber compound in a viscous or plastic state capable of forming an elastic mass relatively fixed in its normal, confined state, but having limited displacement characteristics when partially unconfined.

The tube 1 is provided with a floating partition 19 (Fig. 1) centrally disposed relative to the crown of the tube. Extremities 20 and 21 of the partition 19 are arranged in close proximity with the tube wall 2 but are not connected therewith. The extremities 20 and 21 of the partition 19 overlie approximately half the length of the partitions 8 and 9, respectively. The partition 19 is positioned in symmetry relative to the transaxial plane of the tube 1, and centrifugal force resulting from the tube in operation retains the ends 20 and 21 in close proximity to the wall 2, while a portion of plastic material 22 prevents the main portion of the partition 19 from moving toward the tube wall 2.

Due to the combined crown thickness of the walls 2 and 3 and the filling therebetween, a short puncturing medium such as a tack or small nail is not long enough to pass to the interior of the tube. In such cases where the outer wall 2 has been punctured but the interior wall 3 has not been injured, a sealing action occurs as the sealing medium passes outwardly therethrough and becomes exposed to the air. If any substantial amount of this sealing medium passes from the double wall space before the desired sealing action occurs an adjacent partition or fin will be moved by the internal pressure and loss of support toward the puncture and will aid in restricting the opening and reducing the flow of the medium therethrough while the desired sealing action is taking place. If, however, a nail 23 (Fig. 2) is sufficiently long to enter the interior of the tube, it must pass through at least one and usually two of the partitions, as for example 8 and 19. The partition walls are moved slightly out of place laterally by entry of the nail 23. This is due in part to the elasticity of the partitions, and the filler therebetween. On withdrawal of the puncture producing agent 23 the filler compound hermetically fills the holes left in the walls 2 and 3 through which pressure of inflation and other internal forces tend to force the plastic filler compound. As a quantity of the filler leaves its confining space, the section from which it escapes becomes smaller and the adjacent partition thus correspondingly loses its support. The partition in this way becomes displaced from its original position so that the holes pierced in the partitions 8 and 19 are no longer in line with the holes pierced in the walls 2 and 3. As a result, the path of any air attempting to escape from the interior becomes longer and more circuitous and the resistance to its escape accordingly increases. The shifting of a partition toward the opening in the punctured wall tends to restrict the opening and prevents the passage of an unnecessarily large quantity of sealing medium while the medium tends to harden and seal the puncture. This shifting of the partitions is further augmented by flow of plastic compound from adjacent parts between the walls 2 and 3 to take the place of filler which has escaped from the tube walls. Thus, the partitions having shifted, complete sealing of the pierced region is effected.

The viscosity of puncture sealing compositions usually increases as the temperature of the tire rises due to its operation. In such cases the sealing composition flows to a greater extent, resulting in a greater displacement of the partitions. Consequently, the sealing characteristics as provided in my invention function automatically, with a high degree of efficiency, throughout wide ranges of viscosity of the filler.

In practicing my invention, I have found that various methods of construction and assembly may be employed. A preferred manner of producing my inner tube is by providing a wall 3 of unvulcanized rubber, and attaching thereto by means of pressure the ends of unvulcanized strips of rubber forming the fins 6, 7, 8, 9, 10, and 11. The sealing material is formed into strips to conform approximately to its final shape in the assembly. These strips are laid in place with the fins and the wall 3. The central fin 19 is assembled between strips of sealing material. An outer layer of unvulcanized rubber 2 is placed over the above described assembly, the ends 4 and 5 of the wall 3 are then pressed into adhesion with the wall 2 and marginal portions of the wall 2 are circumferentially spliced together in the region of the rim portion of the tube. Thereafter the assembly is placed in a mold and vulcanized.

As an alternative method of construction the rim portion of the wall 2 and the inner wall 3 may be formed as an annular tube, and the outer portion of the wall 2 at the tread portion may be assembled in a separate operation after the fins and sealing material have been properly located thereon in a manner similar to that described in the preceding paragraph.

As thus shown and described, I have provided a unique puncture sealing inner tube comprising a double walled tube and a multiplicity of partitions extending acutely relative to the two walls of the tube, the intervening spaces being filled with a plastic compound. While this arrangement is a preferred construction, it is to be understood that the partitions might extend from the outer wall in a generally acute direction toward the inner wall, as indicated by the fins 24 and 25 in Fig. 4. It is essential, however, that the partitions extend from one of the walls to close proximity of the second wall and be surrounded by a plastic compound of such a degree of plasticity that, when punctured, a substantial movement of the partitions will occur.

While a preferred embodiment of my invention has been illustrated, it is to be understood that other modifications are contemplated as appear within the scope of the appended claims.

Having thus described my invention, what I claim and desire to protect by Letters Patent is:

1. A puncture sealing inner tube comprising a wall of rubber composition forming an annular member, said member being substantially circular shape in cross section and having a crown portion, a second annular wall of rubber composition spaced from the first named wall at the crown portion thereof and having its marginal edges secured to the first named wall, a plastic sealing material located between the spaced rubber composition walls, and a plurality of relatively spaced circumferentially extending strips of rubber composition arranged within the plastic material and secured to the inner of said annular walls, said strips having free edges extending to locations adjacent the other of said annular walls.

2. A puncture sealing inner tube comprising a wall of rubber composition forming an annular member, said member being substantially circular shape in cross section and having a crown portion, a second annular wall of rubber composition spaced from the first named wall at said crown portion thereof and having its marginal edges secured to the first named wall, a plastic sealing material located between the spaced rubber composition walls, and a plurality of relatively spaced and overlapping circumferentially extending strips of rubber composition arranged within the plastic material and secured to the inner of said annular walls, said strips having free edges extending to locations adjacent the other of said annular walls.

3. A puncture sealing inner tube comprising a wall of rubber composition forming an annular member having a substantially circular shape in cross section, a second wall of rubber composition spaced from the first named wall at least at the crown portion thereof and having its marginal edges secured to the first named wall, a plastic sealing material located between the spaced rubber composition walls, and a plurality of circumferentially extending strips of rubber composition each attached along one of its edges to one of the walls and having its opposite free edge terminating adjacent the other of said walls, and each strip being arranged in relatively spaced and overlapped relation relative to each adjacent strip within the plastic material with the free edge thereof more remotely disposed from the central crown portion of the tube than the attached edge thereof.

4. A puncture sealing inner tube comprising a wall of rubber composition forming an annular member having a substantially circular shape in cross section, a second wall of rubber composition spaced from the first named wall at least at the crown portion thereof and having its marginal edges secured to the first named wall, a plastic sealing material located between the spaced rubber composition walls, and a plurality of circumferentially extending strips of rubber composition each secured at one edge to one of the walls of rubber composition and arranged in spaced and overlapped relation relative to each adjacent strip within the plastic material, each of said strips having its unattached portion extending generally away from the central crown portion of the tube and having its free edge terminating adjacent the other of said walls.

5. A puncture sealing inner tube comprising a wall of rubber composition forming an annular member having a substantially circular shape in cross section, a second wall of rubber composition spaced from the first named wall at least at the crown portion thereof and having its marginal edges secured to the first named wall, a plastic sealing material located between the spaced rubber composition walls, a plurality of circumferentially extending strips of rubber composition each secured at one edge to one of the walls of rubber composition and arranged in relatively spaced and overlapped relation within the plastic material, and a centrally located circumferentially extending strip of rubber composition, having free edges, embedded within the plastic sealing material.

6. A puncture sealing inner tube comprising a wall of rubber composition forming an annular member, said member being substantially circular in cross section and having a crown portion, a second annular wall of rubber composition spaced from the first named wall at said crown portion and having its marginal edges secured to the first named wall, a plastic sealing material located between the spaced walls, and a plurality of circumferentially extending strips of rubber composition embedded in said plastic sealing material and secured to the inner of said annular walls, said strips having at least substantial portions of the edges thereof free from said walls, each free portion extending generally away from the central crown portion of the tube and to locations adjacent the outer of said annular walls.

ERNST EGER.